(12) United States Patent
Klaar

(10) Patent No.: US 6,781,261 B2
(45) Date of Patent: Aug. 24, 2004

(54) GENERATOR ELECTRICAL CONDUCTORS

(75) Inventor: Juergen Klaar, Neukirchen-Vluyn (DE)

(73) Assignee: Siemens Aktiengesellschaft, Munich (DE)

(*) Notice: Subject to any disclaimer, the term of this patent is extended or adjusted under 35 U.S.C. 154(b) by 13 days.

(21) Appl. No.: 10/215,748

(22) Filed: Aug. 9, 2002

(65) Prior Publication Data
US 2003/0029624 A1 Feb. 13, 2003

(30) Foreign Application Priority Data
Aug. 9, 2001 (EP) .......................................... 01119262

(51) Int. Cl.$^7$ ................................................ H02K 3/24
(52) U.S. Cl. ........................ 310/58; 310/59; 310/60 R; 310/61; 310/270
(58) Field of Search .......................... 310/58, 59, 60 R, 310/61, 270, 60 A, 65, 208, 260, 261; 10/52

(56) References Cited

U.S. PATENT DOCUMENTS

| | | | |
|---|---|---|---|
| 2,833,944 A | 5/1958 | Willyoung | 310/61 |
| 3,225,231 A | 12/1965 | Kudlacik | 310/64 |
| 4,543,503 A | 9/1985 | Kaminski et al. | 310/59 |
| 4,709,177 A * | 11/1987 | Kaminski | 310/59 |
| 5,777,406 A * | 7/1998 | Bomba et al. | 310/61 |
| 6,087,745 A * | 7/2000 | Dreher | 310/58 |
| 6,211,586 B1 * | 4/2001 | Hediger et al. | 310/52 |
| 6,288,460 B1 * | 9/2001 | Fakult et al. | 310/52 |
| 6,373,164 B1 * | 4/2002 | Nishimura | 310/207 |

FOREIGN PATENT DOCUMENTS

| | | |
|---|---|---|
| DE | 1 036 370 | 1/1955 |
| DE | 195 43 392 C1 | 11/1995 |
| WO | WO 9605645 A1 | 7/1995 |

* cited by examiner

Primary Examiner—Tran Nguyen
Assistant Examiner—Leda Pham

(57) ABSTRACT

Arrangement of internally cooled electrical conductors, in particular for a generator rotor. A number of internally cooled conductors in each case having a longitudinal conductor and a transverse conductor connected to it, the longitudinal conductors and the transverse conductors being respectively arranged at least approximately parallel and a small distance apart. Advantageous cooling in terms of fluid mechanics is achieved by a cooling duct of a longitudinal conductor of one conductor being connected to a cooling duct of a transverse conductor of an adjacent conductor.

16 Claims, 4 Drawing Sheets

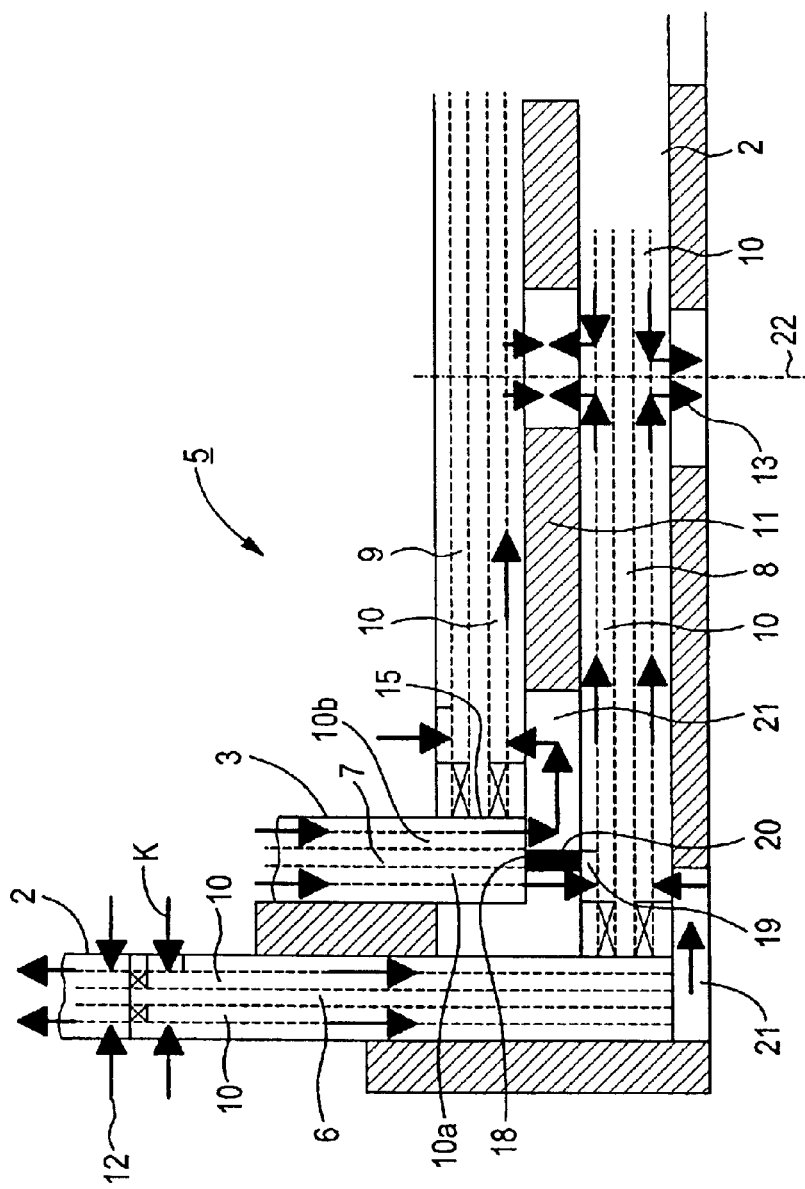

GENERATOR ELECTRICAL CONDUCTORS

CROSS-REFERENCE TO RELATED APPLICATIONS

This application claims priority to EP/01119262.2, filed Aug. 9, 2001 under the European Patent Convention and which is incorporated by reference herein in its entirety.

FIELD OF THE INVENTION

Arrangement of internally cooled electrical conductors, in particular for a generator rotor.

BACKGROUND OF THE INVENTION

The invention relates to an arrangement of internally cooled electrical conductors, which in each case comprise a longitudinal conductor and a transverse conductor, in particular for a coil of a generator rotor. An internally cooled conductor is understood in particular as meaning a directly internally cooled conductor, by contrast with a radially cooled conductor.

Electrical conductors which are designed for high current intensities, such as the coils of a turbo-generator with a power of from about 450 MVA, are usually cooled by internal cooling ducts. In the cross section of a conductor or directly alongside the conductor cross section there runs at least one cooling duct, largely parallel to the conductor. A cooling fluid, in particular a cooling gas, preferably hydrogen, is passed with considerable velocity through the or each cooling duct, the fluid-mechanical design of the cooling duct having a direct effect on the flow velocity and the cooling effect and consequently on the achievable power of the generator. An electrical conductor of this type with a cooling duct is known for example from DE 195 43 392 C1. The flow resistance in the inlet region of the cooling duct is in this case reduced by spreading the conductor in this region.

In an internally cooled conductor, bending or—as a limiting case of bending—buckling of the cooling duct contributes in particular to the flow resistance, the increase in the flow resistance attributable to the deflection of the coolant stream being all the greater the smaller the bending radius is. Inlet loss and outlet loss into and from the respective cooling duct must also be taken into account.

The electrical conductors of a generator rotor run substantially parallel to the axis of the latter, tangentially running conductor portions being connected to the axial conductor portions at the end faces in the region of what is known as the end winding. This connection between the conductor portions that are substantially perpendicular to one another can take place, as is known from DE-B 10 36 370, by bending of the conductor, the cooling duct following the bending all the way. Although this configuration of the conductor and cooling duct avoids buckling within the conductor and cooling duct, it is technically complex from production aspects on account of the bending of the conductor with the internal cooling duct.

In a comparatively simple way in terms of technical production, a tangentially or radially running conductor portion may be integrally bonded with an axially running conductor portion, in particular by soldering, the individual conductor portions in each case being straight and forming at least approximately a right angle. The soldering has the effect of closing the cooling duct or the cooling ducts of one of the connected conductor portions. For this reason, a separate gas inlet or gas outlet must be provided at the connecting point of conductor portions connected perpendicularly to one another. As a result—in particular in the case of parallel arrangement of the cooling duct of the axial conductor portion on the one hand and the tangential conductor portion on the other hand—a number of cooling ducts of lengths differing considerably from one another, in which the cooling fluid is heated to correspondingly different degrees, are formed. The different thermal loading of individual conductor portions has unfavorable effects on the achievable power of the generator.

SUMMARY OF THE INVENTION

The invention is therefore based on the object of specifying a favorable arrangement in terms of technical production of internally cooled electrical conductors, in particular for coils of a generator rotor, with suitable coolant conduction.

This object is achieved according to the invention by the features of claim 1. This provides that, in the case of a number of adjacently arranged conductors, which in each case comprise a longitudinal conductor and a transverse conductor connected to it, and the longitudinal conductors and transverse conductors of which respectively run at least approximately parallel to one another, a cooling duct of a longitudinal conductor of a first conductor is connected to a cooling duct of a transverse conductor of an adjacent second conductor.

The invention is based on the idea that the coolant conduction in an arrangement of internally cooled electrical conductors is to be considered independently of the current conduction. A direct connection of the cooling ducts of two conductor portions electrically connected to one another is not necessary. Conversely, the cooling ducts of conductor portions not electrically connected to one another may be connected fluid-mechanically. Since the achievement of a low flow resistance has priority in the design of cooling ducts, deflections should be avoided as far as possible. Furthermore, the individual cooling ducts should not vary too much in their length, to ensure adequately uniform cooling.

Within a conductor, a right-angled connection between a transverse conductor and a longitudinal conductor may be formed by the end face of the transverse or longitudinal conductor being connected to the wall of the other conductor portion by soldering. The cross sections of the two conductor portions may in this case differ from one another. Since, to avoid weakening the respective soldered connection, the cooling duct cannot be continued in a straight line through the soldered joint on the end face of the transverse or longitudinal conductor, the coolant has to be transported further at this location with a changed direction of flow, for example via a bore to be provided in the wall on the longitudinal side of this conductor portion or what is known as a recessed chamber. In the further transportation of the coolant, the number of deflections should be restricted to a minimum.

If, in the angle formed by one conductor, there lies an inner conductor formed in the same way from a transverse conductor and a longitudinal conductor, with the transverse and longitudinal conductors of the two conductors being arranged at least approximately parallel to one another a small distance apart, the end face of the transverse or longitudinal conductor of the inner conductor lies opposite a wall of the longitudinal or transverse conductor of the outer conductor. Consequently, a connecting duct can be provided between this free end face of the inner conductor and the cooling duct running in the opposite portion of the outer conductor. This connecting duct makes it possible in terms of fluid mechanics to conduct coolant from one portion of the inner conductor into a portion of the outer conductor arranged transversely thereto, or vice versa, with only one deflection.

The offset conductors differ in their length. In this respect, generally both the longitudinal conductor and the transverse conductor are longer in the case of an outer conductor than in the case of an inner conductor. The length of the angles lying in one another decreases from the outside to the inside. If the cooling ducts of the transverse and longitudinal conductors—as part-conductors of a conductor—are respectively arranged in series, the outer conductor is therefore subjected to the greatest thermal loading. This loading is reduced by the connection of the cooling duct of the transverse or longitudinal conductor of the outer conductor to the cooling duct of the longitudinal or transverse conductor of the inner conductor. Taking this an analogous stage further, the part-conductor of the inner-lying conductor not connected to an outer part-conductor can, if appropriate—in the case of a total of a least three mutually offset conductors each with a transverse conductor and a longitudinal conductor—be connected to a part-conductor of a still further inward lying conductor. Consequently, two part-conductors of different conductors are respectively connected, with only a part-conductor of the outermost conductor and a part-conductor of the innermost conductor having separate cooling ducts. In this respect, the separate cooling of the outermost part-conductor is particularly favorable for limiting the thermal loading, on account of its great length in comparison with other part-conductors.

In the case of a number of cooling ducts running in or on a conductor, the use of only one cooling duct is often adequate. In this case, a connection between cooling ducts of different conductors is advantageously configured in such a way that a cooling duct in linear extension of the active cooling duct of one conductor leads only up to one of the cooling ducts of the other conductor which run perpendicularly to it, while the other cooling ducts, respectively, of the conductors are shut off, for example by closure plugs.

Arranged between individual conductors or conductor clusters, running substantially parallel to one another, for example of a coil, is a support, which both performs a mechanical function and keeps the individual conductors or conductor clusters at a distance, isolated from one another. The connecting duct leads through this support or a free space produced by the arrangement of supporting elements of this type. In addition, a further connecting duct may also be provided through the support, between one of a number of cooling ducts of a part-conductor and a cooling duct of a further part-conductor of the same conductor.

The advantages achieved thereby are, in particular, that on the one hand a number of cooling conductors are used in or on a conductor cross section. On the other hand, only a partial stream of the cooling fluid flowing in or on a part-conductor is conducted via a relatively long conducting channel bypassing the soldered connection with respect to a connected part-conductor to the latter, while another part of the cooling fluid flows via a comparatively short and straight connecting duct into a cooling duct of another conductor. Since it is designed only for a partial stream of the cooling fluid, the connecting duct bypassing the soldered connection may have such a small cross section that it is accommodated within the support and does not weaken it in practice. Since the cooling fluid flowing through this bypass duct undertakes part of the cooling work, the flow velocity of the cooling fluid can be reduced, resulting in a low power requirement for the circulation of the cooling fluid. Therefore, with the same flow velocity, the power can be increased, and consequently in the case of a generator the generator power can be increased.

For the outlet of the cooling fluid from a cooling duct, there may be provided, for example, in a way known per se, bores or recessed chambers which are led through a number of conductors and cooling ducts lying radially one above the other in a coil of a generator rotor. To achieve a specifically desired distribution of the various cooling fluid streams, it is possible—as is known from DE 195 43 392 C1—to arrange a cooling duct insert in a cooling duct. It can be determined in this way which cooling fluid stream escapes from the conductor by which path.

The advantages achieved by the invention are, in particular, that uniform cooling is achieved with low pressure losses by the fluid-mechanical connection between cooling ducts of different conductors. As a result, the power required for circulating the cooling fluid is reduced and the possible current intensity in the conductors is increased, so that altogether a more favorable overall energy utilization of the generator is achieved.

BRIEF DESCRIPTION OF THE DRAWINGS

Exemplary embodiments of the invention are explained in more detail below on the basis of the drawing, in which:

FIG. 3 shows a cross section of a number of internally cooled conductors with additional transfer ducts in the form of a detail.

DESCRIPTION OF THE PREFERRED EMBODIMENTS

Figure 1:
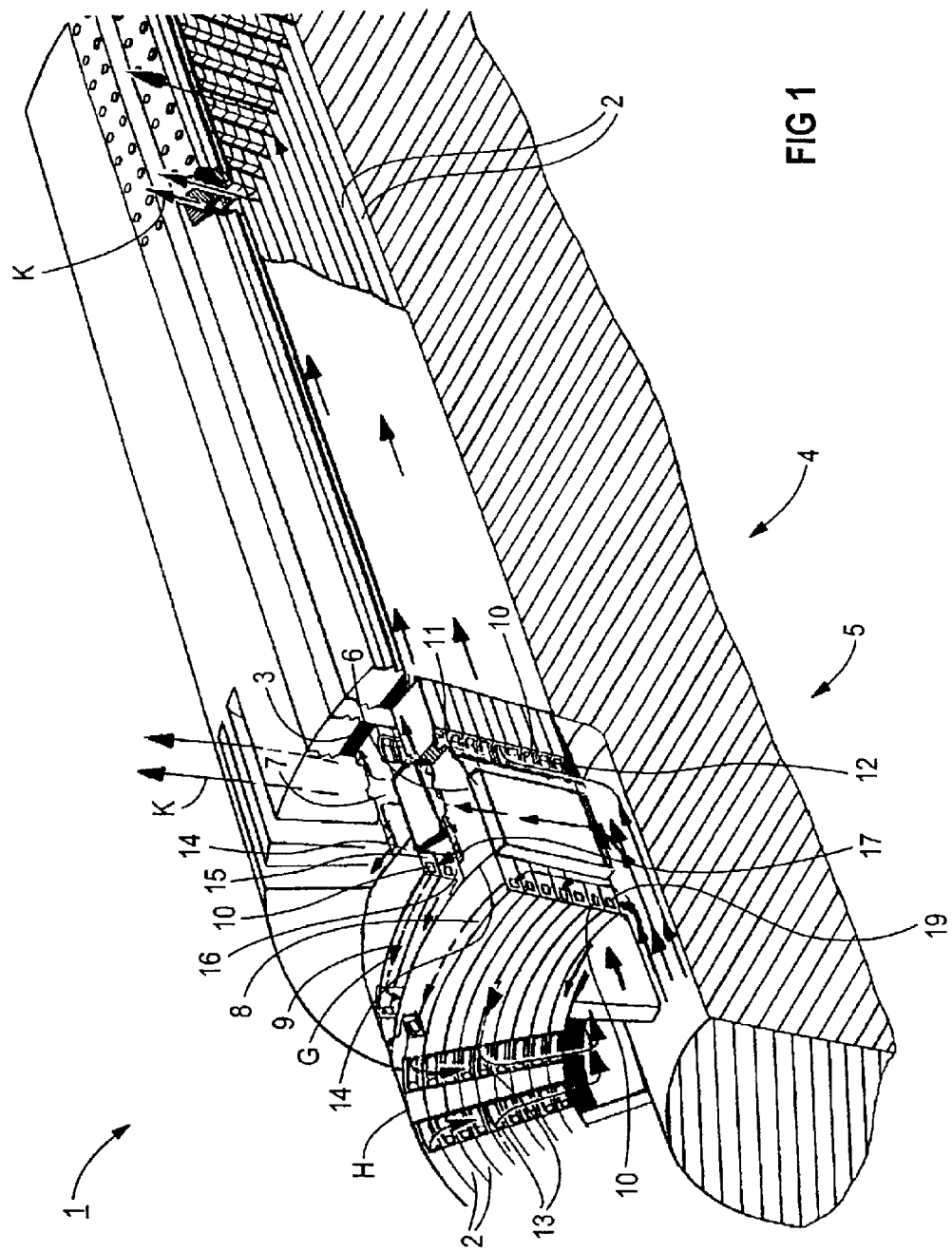
FIG. 1 shows a perspective representation of a generator rotor with internally cooled conductors in the form of a detail.

FIG. 1 shows a detail of a generator rotor 1 cooled by a cooling fluid K, with conductors 2, 3 which run axially in the region of a rotor body 4 and comprise, in the region of an end winding 5, longitudinal conductors 6, 7 with tangentially running transverse conductors 8, 9 connected transversely to them. A number of conductors 2, 3 are respectively arranged radially one above the other and form coils G and H. The coils G, H, represented in the form of details by way of example, are the outermost of the coils arranged on the generator rotor 1, which are designated—from the inside outward—by A to H, with the length of the coils increasing from A to H.

Figure 2:
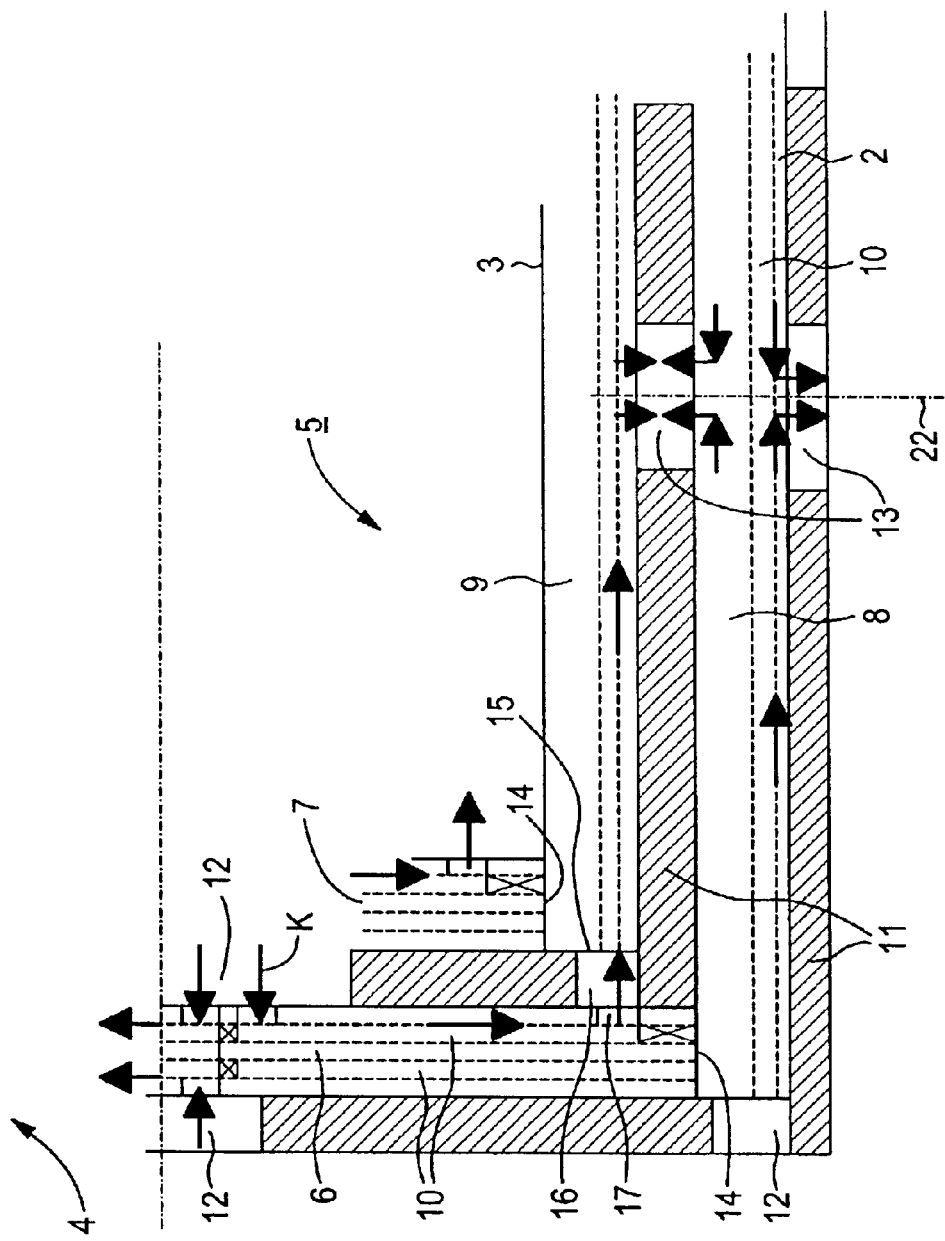
FIG. 2 shows a cross section of a number of internally cooled conductors in the form of a detail.

Represented in FIG. 2 is a detail of the end winding 5 with the longitudinal conductors 6, 7 and the transverse conductors 8, 9. In this case, as a departure from FIG. 1, the longitudinal conductors 6, 7 are arranged on the left of the transverse conductors 8, 9. The individual conductor portions 6 to 9 in each case comprise two cooling ducts 10. Between the conductors 2, 3 and also alongside the conductor 3 there are supports 11, which are only partially represented and are interrupted by gas inlets 12 and gas outlets 13. At the gas inlets 12 and at the gas outlets 13, the cooling fluid K can at least partially flow perpendicularly in relation to the plane represented. The conductors 2, 3 are connected by corner soldered joints 14. On the end face 15 of the transverse conductor 9, the support 11 is interrupted, a connecting duct 16 leading to a cooling duct 10 of the longitudinal conductor 6. Part of the connecting duct 16 is formed in this case by a bore 17 in the longitudinal conductor 6. A cooling duct 10 in the longitudinal conductor 6 of the conductor 2 and a cooling duct 10 in the transverse conductor 9 of the conductor 3 are consequently connected in series.

In an analogous way, the longitudinal conductor 7 of the conductor 3 is connected to a transverse conductor (not represented) of a further inward lying conductor. A respective cooling duct within the conductors 2, 3 is shut off. The outer-lying transverse conductor 8, belonging to the conductor 2, has a cooling duct 10 with a separate gas inlet 12 and gas outlet 13.

In the embodiment represented in FIG. 3, in each case two cooling ducts 10 of a conductor 2, 3 are active. The end face 15 of the transverse conductor 9 is connected to the wall of the longitudinal conductor 7 by soldering. On the end face 18 of the longitudinal conductor 7, the support 11 is interrupted. The cooling fluid K flowing out from the longitudinal conductor 7 can flow into the transverse conductors 8, 9 by two paths. On the one hand, cooling fluid K can flow out from the end face 18 of the longitudinal conductor 7 via the cooling duct 10*a* and flow into a cooling duct 10 of the opposite transverse conductor 8 via a corresponding opening 19. On the other hand, cooling fluid K is passed from the cooling duct 10*b* within the longitudinal conductor 7 via clearances in the support 11, which form a transfer duct 21, into a cooling duct 10 of the transverse conductor 9. For the complete separation of the coolant streams flowing through the cooling ducts 10*a* and 10*b*, an intermediate wall 20 may be provided.

The embodiment represented in FIG. 3 has the advantage that in each case two cooling ducts 10 can be used at least in portions of the conductors 2, 3. At the same time, in the case where the cooling fluid K is passed from a longitudinal conductor 6, 7 into one or more transverse conductors 8, 9, only a single partial stream of the cooling fluid K has to be deflected a number of times. An exception is represented by the cooling fluid passed from the cooling ducts 10 of the longitudinal conductor 6 into a cooling duct 10 of the transverse conductor 8. Here, a transfer of cooling fluid K flowing out from the longitudinal conductor 6 with a single 90° deflection into a cooling duct 10 of the transverse conductor 8 is not possible. Since, however, these are cooling ducts 10 within the outermost conductor 2, there are favorable installation conditions for designing a transfer duct 21 in a way conducive to flow in comparison with a further inward lying conductor 3.

Figure 4A:
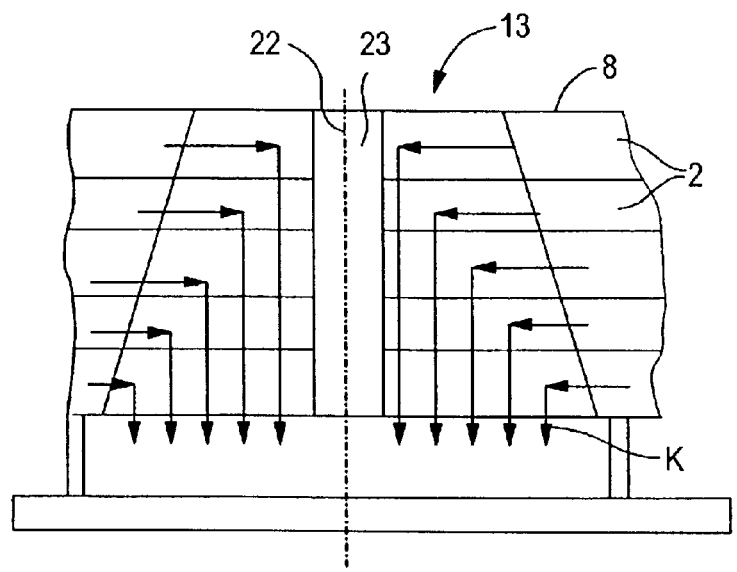
FIGS. 4a–4c respectively show the flow openings in the center of the rotor in cross section, in side view and in plan view in the form of a detail.
Figure 4B:
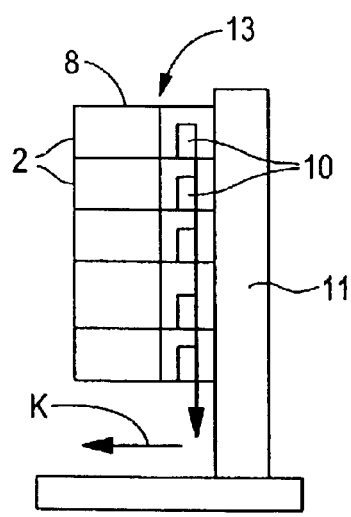
Figure 4C:
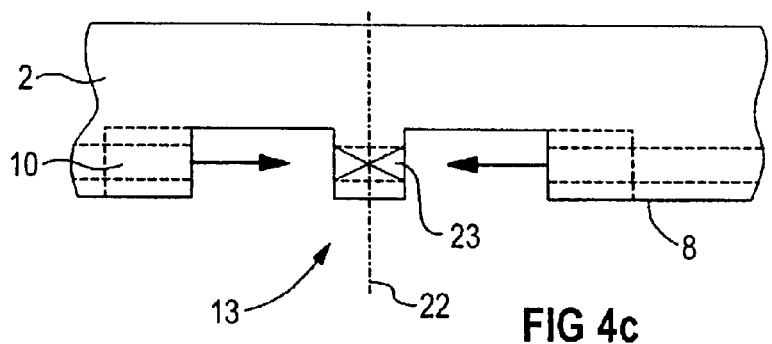

FIGS. 4*a* to 4*c* show a gas outlet 13 in the end winding 5 in various sections. The gas outlet 13 is arranged on the geometrical axis 22 of the generator rotor 1 and has in cross section the trapezoidal form which can be seen in FIG. 4*a*. In the region of the gas outlet 13, the internally cooled conductors 2 run transversely in relation to the geometrical axis 22. The cooling fluid K flows out of the cooling ducts 10 on either side of the geometrical axis 22 toward the latter and is deflected in the gas outlet 13 by 90°. Arranged centrally in the gas outlet 13 for each conductor 2 there is a fitting piece 23, which separates the cooling fluid streams flowing toward the gas outlet 13 from both sides of the geometrical axis 22. The cooling ducts 10 lying one above the other are open to different extents in the region of the gas outlet 13 in such a way that the flow cross section is all the greater the more cooling fluid K flows in this cross section from various cooling ducts 10.

What is claimed is:

1. An internally cooled electrical conductor, comprising:
    an electrical conducting longitudinal portion having an internal longitudinal cooling duct region adapted to carry a cooling fluid;
    an electrical conducting transverse portion connected to the longitudinal portion and arranged generally perpendicular to the longitudinal portion, the transverse portion having an internal transverse cooling duct region that does not directly receive the cooling fluid from the longitudinal portion; and
    a non-electrical conducting bypass portion connected to the longitudinal portion and arranged generally parallel to the transverse portion, the bypass portion having an internal bypass cooling duct region adapted to directly receive the cooling fluid from the longitudinal portion.

2. The electrical conductors as claimed in claim 1, further comprising a connecting duct positioned at an end face of the longitudinal portion and extending the longitudinal cooling duct region in a straight line and opening transversely into the transverse cooling duct region of the transverse portion.

3. The electrical conductors as claimed in claim 1, further comprising a connecting duct positioned at an end face of the transverse portion and extending the transverse cooling duct region in a straight line and opening out transversely into the longitudinal cooling duct of the longitudinal portion.

4. The electrical conductors as claimed in claim 1, wherein a plurality of longitudinal portion cooling duct regions run parallel in the longitudinal portion.

5. The electrical conductor as claimed in claim 4, wherein a first parallel longitudinal portion cooling duct region is connected to the transverse portion cooling duct region and a second parallel longitudinal portion cooling ducts region is connected to a transverse portion cooling duct region of an adjacent transverse portion.

6. The electrical conductor as claimed in claim 1, wherein a plurality of transverse portion cooling ducts region run parallel in the transverse portion.

7. The electrical conductor as claimed in claim 6, which one of the parallel transverse portion cooling duct regions is connected to the longitudinal portion cooling duct region and the second parallel transverse portion cooling duct region is connected to a longitudinal portion cooling duct region of an adjacent conductor.

8. The electrical conductors as claimed in claim 1, wherein the electrical conductor is used in an electric generator.

9. The electrical conductor as claimed in claim 1, wherein the transverse cooling duct region is substantially similar in length to the longitudinal cooling duct region.

10. An end winding assembly for an electric generator, comprising:
    a first electrical conductor having a longitudinal portion and an internal longitudinal cooling duct region arranged within the longitudinal portion adapted to carry a cooling fluid;
    a second electrical conductor connected to the first electrical conductor, the second conductor having an internal transverse cooling duct region that does not directly receive the cooling fluid from the longitudinal portion;
    a bypass member having a cooling duct region connected to the first electrical conductor adapted to directly receive the cooling fluid from the longitudinal portion; and an insulator arranged between the first electrical conductor and second electrical conductor.

11. The end winding assembly as claimed in claim 10, wherein a plurality of first and second internally cooled electrical conductors are stacked in a radial direction relative to an axial centerline of a rotor body.

12. The end winding assembly as claimed in claim 11, wherein each radially stacked layer is nested longitudinally so that a longitudinal length of each layer decreases as a radial distance from the rotor centerline increases.

13. The end winding assembly as claimed in claim 10, wherein the first electrical conductor is arranged generally perpendicular to the second conductor.

14. The end winding assembly in claim 10, wherein the bypass member is connected to the longitudinal portion and arranged generally parallel to the transverse portion with the bypass cooling duct region adapted to directly receive the cooling fluid from the longitudinal portion.

15. The end winding assembly as claimed in claim 10, wherein the conducting bypass member is a non-electrical conducting member arranged generally parallel to the transverse portion.

16. The electrical conductor as claimed in claim 10, wherein the transverse cooling duct region is substantially similar in length to the longitudinal cooling duct region.

* * * * *